(12) United States Patent
Ochi et al.

(10) Patent No.: US 11,179,880 B2
(45) Date of Patent: Nov. 23, 2021

(54) BUILDING APPARATUS AND BUILDING METHOD

(71) Applicant: MIMAKI ENGINEERING CO., LTD., Nagano (JP)

(72) Inventors: Kazuhiro Ochi, Nagano (JP); Masakatsu Okawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 342 days.

(21) Appl. No.: 16/099,436

(22) PCT Filed: May 23, 2017

(86) PCT No.: PCT/JP2017/019145
§ 371 (c)(1),
(2) Date: Nov. 7, 2018

(87) PCT Pub. No.: WO2017/204200
PCT Pub. Date: Nov. 30, 2017

(65) Prior Publication Data
US 2019/0210272 A1    Jul. 11, 2019

(30) Foreign Application Priority Data

May 23, 2016 (JP) .............................. JP2016-102514

(51) Int. Cl.
*B29C 64/112* (2017.01)
*B41J 2/175* (2006.01)
(Continued)

(52) U.S. Cl.
CPC .......... *B29C 64/112* (2017.08); *B29C 64/255* (2017.08); *B41J 2/175* (2013.01); *B41J 2/2114* (2013.01); *B33Y 10/00* (2014.12); *B33Y 30/00* (2014.12)

(58) Field of Classification Search
CPC .... B29C 64/112; B29C 64/255; B41J 2/2114; B41J 2/175; B33Y 10/00; B33Y 30/00
See application file for complete search history.

(56) References Cited

U.S. PATENT DOCUMENTS

| | | | |
|---|---|---|---|
| 6,350,022 B1 * | 2/2002 | Takemura | B41J 2/1752 347/85 |
| 2014/0362133 A1 * | 12/2014 | Tanaka | B41J 2/1752 347/3 |

(Continued)

FOREIGN PATENT DOCUMENTS

| CN | 1107780 | 9/1995 |
|---|---|---|
| CN | 1280059 | 1/2001 |

(Continued)

OTHER PUBLICATIONS

"International Search Report (Form PCT/ISA/210) of PCT/JP2017/019145," dated Jul. 18, 2017, with English translation thereof, pp. 1-4.

(Continued)

*Primary Examiner* — Nahida Sultana
(74) *Attorney, Agent, or Firm* — JCIPRNET

(57) ABSTRACT

A building apparatus having a configuration more suitable for building an object is provided. The building apparatus is configured to build an object in three-dimensional by ejecting ink. The building apparatus includes an ink container holder 202 that is a first container holder for holding an ink container 302 that is a first ink container, an ink container holder 204 that is a second container holder for holding an ink container 304 that is a second ink container, a first ejection head for ejecting ink supplied from the ink container 302, and a second ejection head for ejecting ink supplied from the ink container 304. The capacity of the ink container 302 is smaller than the capacity of the ink container 304.

12 Claims, 4 Drawing Sheets

(51) Int. Cl.
  *B29C 64/255* (2017.01)
  *B41J 2/21* (2006.01)
  *B33Y 10/00* (2015.01)
  *B33Y 30/00* (2015.01)

(56) References Cited

U.S. PATENT DOCUMENTS

| | | |
|---|---|---|
| 2015/0183163 A1 | 7/2015 | Beak et al. |
| 2016/0114588 A1* | 4/2016 | Nakamura ............... B41J 2/175 347/85 |
| 2017/0246879 A1* | 8/2017 | Kudo .................. B41J 2/17553 |

FOREIGN PATENT DOCUMENTS

| | | |
|---|---|---|
| CN | 1344208 | 4/2002 |
| CN | 101052528 | 10/2007 |
| JP | 2000280354 | 10/2000 |
| JP | 2001018297 | 1/2001 |
| JP | 2010076235 | 4/2010 |
| JP | 2014166741 | 9/2014 |
| JP | 2015071282 | 4/2015 |
| JP | 2016065207 | 4/2016 |
| WO | 2015107789 | 7/2015 |

OTHER PUBLICATIONS

"Office Action of China Counterpart Application", dated Apr. 1, 2020, with English translation thereof, pp. 1-21.
"Office Action of Japan Counterpart Application", dated Mar. 23, 2021, with English translation thereof, pp. 1-8.

* cited by examiner

BUILDING APPARATUS AND BUILDING METHOD

CROSS-REFERENCE TO RELATED APPLICATION

This application is a 371 application of the international PCT application serial no. PCT/JP2017/019145, filed on May 23, 2017, which claims the priority benefits of Japan application no. 2016-102514, filed on May 23, 2016. The entirety of each of the abovementioned patent applications is hereby incorporated by reference herein and made a part of this specification.

TECHNICAL FIELD

The present invention relates to a building apparatus and a building method.

BACKGROUND ART

Conventionally, in Patent Literature 1, 3D printers and 3D building apparatuses are known as building apparatuses which build a three-dimensional (3D) object using inkjet heads. In this case, a building apparatus builds an object by additive manufacturing by forming a layer of ink using ink that is liquid ejected from inkjet heads and adding a plurality of layers of ink.

CITATION LIST

Patent Literature

Patent Literature 1: Japanese Unexamined Patent Publication No. 2015-71282

SUMMARY OF INVENTION

Technical Problem

Conventionally, inkjet printers printing two-dimensional images are popular as apparatuses that use inkjet heads. Given this, an inkjet printer partially modified may be used as a building apparatus that builds an object using inkjet heads.

However, printing a two-dimensional image using an inkjet printer and building a three-dimensional object using a building apparatus are different in various points. It is therefore preferable that a building apparatus has a configuration more suitable for building objects. The present invention is then aimed to provide a building apparatus and a building method capable of solving the problem above.

Solutions to the Problems

As for the differences between inkjet printers and building apparatuses, the inventor of the subject application has noticed that how ink is consumed greatly differs. Specifically, when an image is printed with an inkjet printer, a plurality of inks corresponding to process colors for color representation are generally used. In this case, in general, there is no significant difference among colors as to the amount of consumption which is the average amount of ink used to print many various images.

By contrast, when an object is built with a building apparatus, inks used may be different from those for printing an image. During building of an object, a building ink such as a white ink may be used as ink for forming at least an interior of the object. An ink serving as a material of a support layer supporting the object being built may be used. In addition to these inks, a plurality of inks corresponding to process colors may be used as a coloring ink when a colored object is built. In this case, colorless transparent clear ink may be additionally used.

When an object is built with a building apparatus, the amount of consumption may significantly vary among the kinds of ink. Specifically, when a colored object is built, only a surface region visible from the outside may be colored. In this case, the interior region is formed with the building ink such as the white ink and only the surface region is formed with the coloring ink. Building an object in this manner can significantly reduce the amount of consumption of the coloring ink for each color compared with the amount of consumption of the building ink.

When a support layer is formed on the periphery of an object, a large amount of ink serving as material of the support layer is usually consumed. For this reason, the amount of consumption of the coloring ink for each color may be significantly smaller than the amount of consumption of ink serving as material of the support layer. More specifically, the inventor of the subject application has conducted building and found that the ratio in amount of consumption, which is the use ratio of ink, among the building ink, the ink serving as the material of the support layer, and the coloring ink for each color is approximately 1:3:0.01, as an example.

Inkjet printers and building apparatuses store various inks to be used for building in ink containers. Containers such as cartridges and ink tanks may be used as the ink containers. When an ink of any color runs out, the ink container is replaced or replenished with ink as appropriate. Therefore, it seems that it is only necessary to replace or replenish the ink containers if the amount of consumption of ink varies among inks in a building apparatus.

However, when the amount of consumption varies among inks as described above, various problems less likely to occur with inkjet printers may arise. In the configuration in which ink containers such as cartridges are replaced, ink less consumed is likely to expire although there is ink left. In this case, the ink container including ink should be discarded, resulting in much waste.

In order to reduce such waste, an ink container such as an ink tank that can be replenished may be used. In this case, however, when the amount of consumption of ink is small, old ink tends to be left for a long time. In particular, when a large ink tank is used to accommodate ink much consumed, ink less consumed tends to expire. In this case, replenishing before ink is running out may gradually deteriorate the quality of ink because the ink tank with much old ink left is replenished with ink. Moreover, using the expired ink may reduce the quality of building.

In this respect, the inventor of the subject application has found that various problems as described above specific to the building apparatus can be solved by providing ink containers of different sizes according to the kinds of ink. The inventor has further conducted elaborate studies to find features necessary to achieve such effects and completed the present invention.

In order to solve the problem above, the present invention provides a building apparatus configured to build an object in three-dimensional by ejecting ink. The building apparatus includes a first container holder configured to hold a first ink container for storing a first ink, a second container holder configured to hold a second ink container for storing a second ink different from the first ink, a first ejection head configured to eject the first ink supplied from the first ink container, and a second ejection head configured to eject the second ink supplied from the second ink container. The first ink container has a capacity smaller than a capacity of the second ink container.

In such a configuration, even when the amount of consumption varies among inks used for building, ink can be stored in an ink container according to the amount of consumption of each individual ink. This configuration therefore can prevent various problems otherwise caused by the difference in amount of consumption among inks. Accordingly, a building apparatus having a configuration more suitable for building an object can be provided appropriately.

In this configuration, the ink refers to liquid ejected from an ejection head. The ejection head is an inkjet head ejecting ink by inkjet scheme. UV curable ink can be suitably used as a variety of inks for use in building.

A container capable of being replenished with ink can be suitably used as the second ink container. In this case, a container not capable of being replenished with ink may be used as the first ink container. Alternatively, a container capable of being replenished with ink may be used as the first ink container. Alternatively, a container not capable of being replenished with ink may be used as the second ink container.

In this configuration, the first ink is a coloring ink. In this case, the coloring ink refers to an ink for coloring for each color of process colors for color representation. The second ink refers to inks other than the ink for each color of process colors. In this case, the second ink may be part of the inks other than the ink for each color of process colors. More specifically, the second ink may be a building ink to be used for forming at least the interior of the object. The building ink may be white ink. Alternatively, the second ink may be ink serving as material of a support layer or transparent clear ink.

When an object colored with various colors is built in full color, it is necessary to use a plurality of inks of colors such as yellow (Y), magenta (M), cyan (C), and black (K). In this case, using a large ink container for each color requires a large space for installing the ink containers. By contrast, reducing the size of the ink container of the coloring ink significantly reduces the installation space for ink containers. Also in this respect, it is preferable to use the coloring ink as the first ink and store the coloring ink in the first ink container with a small capacity.

When ink is expired, the characteristics of ink may change to influence the accuracy of ink droplet landing positions. When a colored object is built, displacement in landing position of the coloring ink for each color may prevent appropriate representation of the desired color. As a result, the quality of building may be deteriorated. By contrast, in the case of the building ink, the displacement in landing positions may have less influence compared with the coloring ink. Therefore, when a colored object is built, it is desirable to minimize the change in characteristics of ink, especially for the coloring ink. Also in this respect, it is preferable to use the coloring ink as the first ink and store the coloring ink in the first ink container with a small capacity.

According to another aspect, the present invention provides a building method having the similar features as described above. Also in this case, the similar effects as described above can be achieved.

Effect of the Invention

The present invention appropriately provides a building apparatus having a configuration more suitable for building an object.

DESCRIPTION OF THE DRAWINGS

FIG. 1(a) illustrates an exemplary configuration of the main part of the building apparatus 10. FIG. 1(b) illustrates an example of the detailed configuration of a head 12.

FIGS. 2(a) and 2(b) are perspective views of the ink supplier 18 as viewed from different angles.

FIG. 3(a) is a cross-sectional view of an exemplary configuration of the object 50 built in a surface decorating mode together with a support layer 52. FIG. 3(b) is a cross-sectional view of an exemplary configuration of the object 50 built in a non-coloring mode together with a support layer 52.

FIG. 4(a) illustrates a modified configuration of the head 12. FIG. 4(b) illustrates a modified configuration of the ink supplier 18 in a simplified manner.

DESCRIPTION OF EMBODIMENT

Figure 1A:
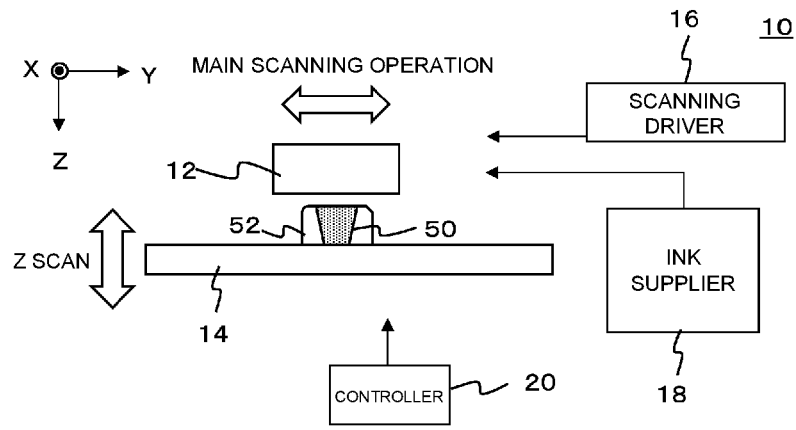
FIGS. 1(a) and 1(b) are diagrams illustrating an example of a building apparatus 10 according to an embodiment of the present invention.
Figure 1B:
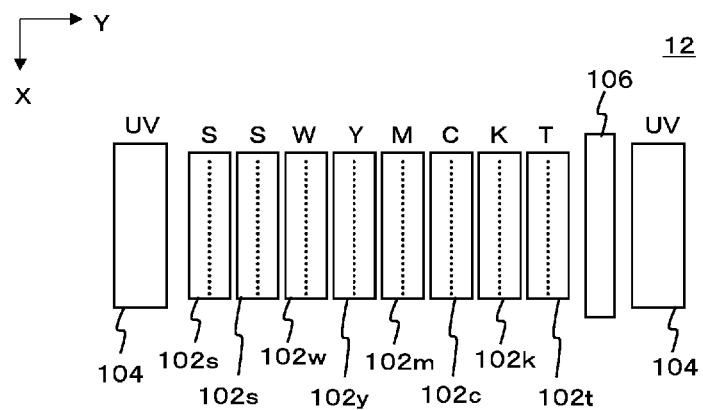

Embodiments according to the present invention will be described below with reference to the attached drawings. FIGS. 1(a) and 1(b) illustrate an exemplary building apparatus 10 according to an embodiment of the present invention. FIG. 1(a) illustrates an exemplary configuration of the main part of the building apparatus 10.

The building apparatus 10 may have the same or similar configuration as a known building apparatus, except for the points described below. More specifically, except for the points described below, the building apparatus 10 may have the same or similar configuration as a known building apparatus that performs building by ejecting droplets (ink droplets) as the material used for building using an inkjet head. The building apparatus 10 may further include a variety of configurations necessary for building or coloring an object 50 in addition to the configuration illustrated in the figures.

In this example, the building apparatus 10 is an apparatus that builds the object 50 in three-dimensional through additive manufacturing by ejecting ink. In this case, additive manufacturing refers to a method of building the object 50 by building up a plurality of layers. The object 50 refers to a three-dimensional structure. In this example, the building apparatus 10 includes a head 12, a stage 14, a scanning driver 16, an ink supplier 18, and a controller 20.

The head 12 is a portion that ejects droplets as a material of the object 50, ejects ink to be cured in accordance with a predetermined condition, and causes the ink to be cured to form respective layers constituting the object 50 in an overlapping manner. In this example, the head 12 includes a plurality of inkjet heads and a plurality of UV light sources 104. As the ink, used is a UV curable ink that is cured by being irradiated with ultraviolet rays. In this case, the ink means liquid ejected from the inkjet head. The inkjet head means an ejection head that ejects the liquid (droplet) by an inkjet method. The head 12 further forms a support layer 52 around the object 50. In this case, the support layer 52 is a deposition structure that supports the object 50 by surrounding an outer circumference of the object 50 being built. A more specific configuration of the head 12 will be described in detail later.

The stage 14 is a table-like member supporting an object 50 being built and is disposed at a position opposed to the inkjet heads in the head 12, and the object 50 being built is placed on the upper surface of the stage 14. In this example, the stage 14 is configured such that at least its upper surface is movable in the deposition direction that is the Z direction in the figure and is driven by the scanning driver 16 so that at least the upper surface is moved with the progress of building of the object 50. In this case, the deposition direction is a direction in which a building material is deposited in additive manufacturing. More specifically, in this example, the deposition direction is the Z direction in the figure orthogonal to the main scanning direction that is the Y direction in the figure and the sub scanning direction that is the X direction in the figure, as preset in the building apparatus 10.

The scanning driver 16 is a driver that allows the head 12 to perform a scanning operation of moving relative to the object 50. In this case, moving relative to the object 50 being built means moving relative to the object 50 being built on the stage 14 by moving relative to the stage 14 having the object 50 thereon. Allowing the head 12 to perform a scanning operation means allowing the inkjet heads in the head 12 to perform a scanning operation.

More specifically, in this example, the scanning driver 16 allows the head 12 to perform, as scanning operation, a main scanning operation that is a Y scan, a sub scanning operation that is an X scan, and a deposition-direction scan that is a Z scan. In this case, the main scanning operation is an operation of ejecting ink while moving in the main scanning direction that is the Y direction preset in the building apparatus 10. The scanning driver 16 allows the head 12 to perform a main scanning operation by moving the head 12 while fixing the position of the stage 14 in the main scanning direction. In a main scanning operation, the scanning driver 16 further drives the UV light source 104 in the head 12. More specifically, the scanning driver 16 turns on the UV light source 104 in a main scanning operation to cure ink droplets placed on a built surface of the object 50. The built surface of the object 50 refers to a surface on which the next layer of ink is to be formed by the head 12.

The sub scanning operation is the operation of moving relative to the stage 14 in the sub scanning direction that is the X direction orthogonal to the main scanning direction. The sub scanning operation may be the operation of moving relative to the stage 14 in the sub scanning direction by a preset feed amount. The scanning driver 16 allows the head 12 to perform a sub scanning operation by moving the stage 14 while fixing the position of the head 12 in the sub scanning direction in an interval between main scanning operations.

The deposition-direction scan is the operation of moving the head 12 relative to the stage 14 in the deposition direction that is the Z direction. The scanning driver 16 allows the head 12 to perform a deposition-direction scan by moving at least one of the head 12 or the stage 14 in the deposition direction. In this case, moving the head 12 in the deposition direction means moving the inkjet heads in the head 12 in the deposition direction. Moving the stage 14 in the deposition direction means moving the position of at least the upper surface of the stage 14. The scanning driver 16 allows the head 12 to perform a deposition-direction scan to change the distance between the inkjet heads in the head 12 and the stage 14. This distance may be a distance between the nozzle surface having nozzles in the inkjet head and the upper surface of the stage 14. More specifically, the scanning driver 16 moves the stage 14 while fixing the position of the head 12 in the deposition direction. The scanning driver 16 thus adjusts the distance between the built surface of the object 50 and the head 12 during the process of building.

As described above, in the main scanning operation, the sub scanning operation, and the deposition-direction scan, movement of the head 12 may be movement relative to the object 50. Therefore, the main scanning operation, the sub scanning operation, and the deposition-direction scan are not limited to the operations described above as long as at least one of the head 12 and the stage 14 is moved. For example, both of the head 12 and the stage 14 may be moved. In the main scanning operation, the stage 14 may be moved. In the sub scanning operation and the deposition-direction scan, the head 12 may be moved.

The ink supplier 18 is a configuration for supplying ink to the inkjet heads in the head 12. In this example, the ink supplier 18 is an ink supply unit that supplies different kinds of ink to a plurality of inkjet heads in the head 12. In this case, the ink supply unit is a configuration attached to the main part of the building apparatus 10 to supply ink to the head 12. A more specific configuration of the ink supplier 18 will be described in detail later.

The controller 20 is a central processing unit (CPU) of the building apparatus 10 and controls each portion in the building apparatus 10 to control the operation of building an object 50. More specifically, the controller 20 controls each portion in the building apparatus 10 based on the shape information, color image information, etc. of an object 50 to be built. According to this example, an object 50 can be built appropriately.

A more specific configuration of the head 12 will now be described. FIG. 1(b) illustrates an example of the detailed configuration of the head 12. In this example, the head 12 includes a plurality of inkjet heads, a plurality of UV light sources 104, and a flattening roller 106. As illustrated in the figure, a plurality of inkjet heads include a plurality of inkjet heads 102s, an inkjet head 102w, an inkjet head 102y, an inkjet head 102m, an inkjet head 102c, an inkjet head 102k, and an inkjet head 102t, which are hereinafter referred to as a plurality of inkjet heads 102s to 102t.

A plurality of inkjet heads 102s to 102t are an example of ejection heads and eject ink by inkjet scheme. More specifically, in this example, each of the plurality of inkjet heads 102s to 102t is an inkjet head ejecting UV curable ink. The plurality of inkjet heads 102s to 102t are aligned in the sub scanning direction and disposed side by side in the main scanning direction. Known inkjet heads can be suitably used as the plurality of inkjet heads 102s to 102t. Each of the plurality of inkjet heads 102s to 102t has a nozzle row having a plurality of nozzles arranged in a row in the sub scanning direction on the surface opposed to the stage 14. Each of the plurality of inkjet heads 102s to 102t thus ejects ink in the direction toward the stage 14.

The arrangement of the plurality of inkjet heads 102s to 102t and the kinds of inkjet heads in the head 12 are not limited to the configuration illustrated in the figures, and may be changed in various ways. For example, some of the inkjet heads may be disposed so as to be displaced from the other inkjet heads in the sub scanning direction. The head 12 may further include inkjet heads for colors, such as pale colors, red (R), green (G), blue (B), and orange.

The inkjet head 102s is an inkjet head that ejects ink as a material of the support layer 52. In this example, the support layer 52 is formed as needed at the time of building the object 50, and removed after the building is completed. It is preferable to use a water-soluble material as the material of the support layer 52 that can be dissolved in water after the object 50 is built. In this case, it is preferable to use a material that is easily decomposable and has a cure degree with respect to ultraviolet rays is lower than that of the material constituting the object 50. As the material of the support layer 52, a known material for a support layer can be preferably used.

When the support layer 52 is formed on the periphery to form an object 50, the amount of consumption of ink serving as material of the support layer 52 is particularly larger than the amount of consumption of other inks. In this respect, according to the example, a plurality of inkjet heads 102s are used so that more ink serving as material of the support layer 52 can be ejected appropriately in each main scanning operation. An object 50 therefore can be built more appropriately even when the amount of consumption of ink serving as material of the support layer 52 is large.

The inkjet head 102w is an inkjet head that ejects ink of white (W). In this example, white ink is used in a case of forming a light-reflective region in the object 50. In a case of building the object 50 the surface of which is colored, the light-reflective region is formed inside the colored region of the object 50. In this example, the white ink is also used as the building ink that is used for forming at least the interior of the object 50.

The inkjet head 102y, the inkjet head 102m, the inkjet head 102c, and the inkjet head 102k are inkjet heads ejecting different coloring inks and hereinafter referred to as inkjet heads 102y to 102k. In this case, the coloring inks are inks of each color of process colors for color representation. More specifically, in this example, the inkjet heads 102y to 102k eject UV curable inks of yellow (Y), magenta (M), cyan (C), and black (K).

In this example, UV curable ink is used as the coloring ink as described above. The coloring ink in this example is therefore not a colorant for the purpose of coloring another ink such as building ink of an achromatic color, but is an ink capable of forming a three-dimensional pixel by itself, the three-dimensional pixel being a voxel in an object 50. In this case, being capable of forming a three-dimensional pixel by itself means that at least part of three-dimensional pixels constituting an object 50 can be formed only with the coloring ink without using the building ink and the like.

In building an object 50, in addition to ink for each color of process colors, clear ink may be used to form a region to be colored, that is, a colored region. In a broader sense, clear ink may also be considered as coloring ink. However, in the description above and the following description, clear ink is not included in coloring inks, and only inks of chromatic colors such as Y, M, C, and K are referred to as coloring ink, unless otherwise specified.

The inkjet head 102t is an inkjet head for ejecting clear ink. In this case, the clear ink refers to colorless and transparent (T) clear ink.

In this example, inks of Y, M, C, and K are examples of a first ink. The inkjet heads 102y to 102k are examples of a first ejection head ejecting the first ink. Ink serving as material of the support layer 52, white ink, and clear ink are examples of a second ink different from the first ink. The inkjet head 102s, the inkjet head 102w, and the inkjet head 102t are examples of a second ejection head ejecting the second ink.

A plurality of UV light sources 104 are configuration for curing ink and generate ultraviolet rays for curing UV curable ink. Ultraviolet light emitting diode (UVLEDs) can be suitably used as UV light sources 104. Alternatively, metal halide lamps or mercury lamps may be used as UV light sources 104. In this example, the respective UV light sources 104 are arranged at one end side and the other end side of the main scanning direction of the head 12 to hold the inkjet heads 102s to 102t therebetween.

The flattening roller 106 is configuration for flattening a layer of ink formed during building of an object 50. In this example, the flattening roller 106 is arranged between the inkjet heads 102s to 102t and the UV light source 104. Accordingly, the flattening roller 106 is arranged side by side in the main scanning direction with the inkjet heads 102s to 102t while being aligned therewith in the sub scanning direction. In this case, the flattening roller 106 removes part of the ink before curing by being in contact with the surface of the layer of the ink at the time of main scanning operation, for example, to flatten the layer of the ink.

In this example, the head 12 includes only one flattening roller 106. In this case, the flattening roller 106 is arranged between the UV light source 104 on one end side of the head 12 and the inkjet heads 102s to 102t. In this case, the scanning driver 16 causes the head 12 to perform at least the main scanning operation in a direction (one direction) in which the flattening roller 106 is at the rear side of the inkjet heads 102s to 102t. The flattening roller 106 flattens the layer of the ink during the main scanning operation in this direction. The scanning driver 16 may cause the head 12 to perform the main scanning operation in both directions. In this case, the flattening roller 106 flattens the layer of the ink only when the main scanning operation in one direction is being performed.

Figure 2A:
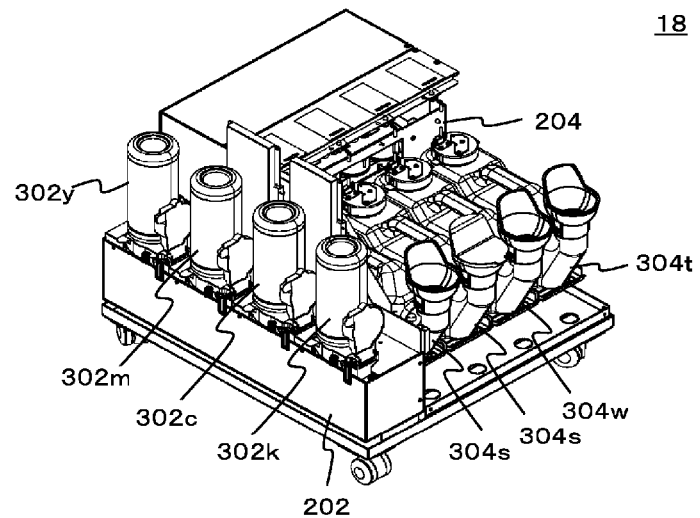
FIGS. 2(a) and 2(b) are diagrams illustrating an example of the detailed configuration of an ink supplier 18.
Figure 2B:
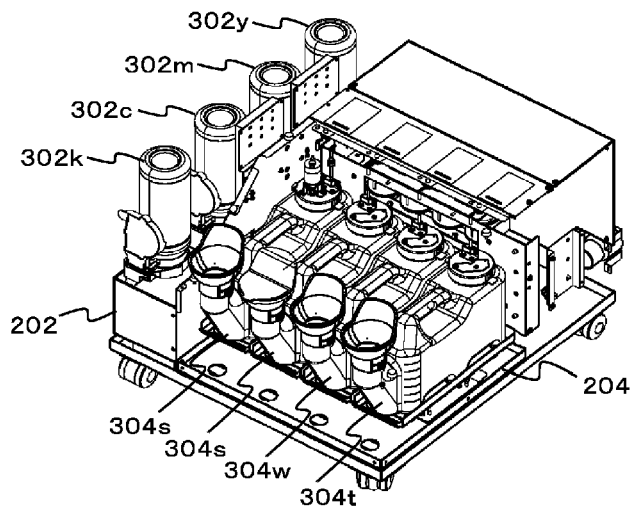

A more specific configuration of the ink supplier 18 will now be described. FIGS. 2(a) and 2(b) illustrate an example of the detailed configuration of the ink supplier 18. FIGS. 2(a) and 2(b) are perspective views of the ink supplier 18 as viewed from different angles. In this example, the ink supplier 18 includes a plurality of ink container holders 202 and 204. A plurality of ink container holders 202 and 204 are holders for holding ink containers.

The ink container holder 202 is an example of a first container holder and holds a plurality of ink containers 302y, 302m, 302c, and 302k, which are hereinafter referred to as ink containers 302y to 302k. The ink containers 302y to 302k are examples of a first ink container for storing the first ink and store coloring inks which are inks of process colors different from each other. More specifically, the ink container 302y stores yellow ink. The ink container 302m stores magenta ink. The ink container 302c stores cyan ink. The ink container 302k stores black ink.

In this example, the ink container holder 202 holds the ink containers 302y to 302k in a replaceable manner. The ink containers 302y to 302k are containers not capable of being replenished with ink in a state in which they are held in the ink container holder 202. Therefore, when any one of the ink containers 302y to 302k is empty, the empty ink container is replaced by a new ink container. To put it more generally, the ink container holder 202 can be considered as a configuration that holds the ink containers 302y to 302k which are a plurality of first ink containers at least corresponding to the colors of coloring inks to build an object 50 in FIGS. 1(*a*) and 1(*b*).

The ink containers 302*y* to 302*k* are connected to the inkjet heads 102*y* to 102*k*, respectively, in the head 12 in FIGS. 1(*a*) and 1(*b*) through ink channels in the building apparatus 10 in FIGS. 1(*a*) and 1(*b*). The inkjet heads 102*y* to 102*k* thus eject ink supplied from the ink containers 302*y* to 302*k*.

In this example, the ink containers 302*y* to 302*k* are ink bottles which are bottle-shaped containers. In a modified configuration of the ink supplier 18, ink containers in a different form may be used as the ink containers 302*y* to 302*k*. For example, ink containers such as ink tanks and ink cartridges may be used as the ink containers 302*y* to 302*k*.

As described above, in this example, the ink containers 302*y* to 302*k* are containers not capable of being replenished with ink in a state in which they are held in the ink container holder 202. In such a configuration, a hermetically sealed container is used for coloring ink to appropriately prevent deterioration of quality. In a modified configuration of the ink supplier 18, containers that can be replenished with ink in a state in which they are held in the ink container holder 202 may be used as the ink containers 302*y* to 302*k*. Even in this case, an ink container 302 with a small capacity is used so that ink can be consumed appropriately before the expiration date of ink. This enables replenishment of ink appropriately in a state in which the ink in the container is sufficiently scarce.

The ink container holder 204 is an example of a second container holder and holds two ink containers 304*s*, one ink container 304*w*, and one ink container 304*t*. These ink containers 304*s*, 304*w*, and 304*t*, which are hereinafter referred to as ink containers 304*s* to 304*t*, are examples of a second ink container for storing the second ink and store inks other than inks of process colors. In this example, the inks stored in the ink containers 304*s* to 304*t* are achromatic inks.

More specifically, two ink containers 304*s* are examples of a support ink container and store ink serving as material of a support layer. The ink container 304*w* stores white ink. As explained above, in this example, the white ink is also used as the building ink. The ink container 304*w* is therefore also an example of a building ink container, which is a container for storing the building ink. The ink container 304*t* stores clear ink.

In this example, the ink containers 304*s* to 304*t* are containers that can be replenished with ink in a state in which they are held in the ink container holder 204. This allows the user to refill the containers with ink when the ink in the ink containers 304*s* to 304*t* is scarce.

In this case, various known supply sources can be used for supply sources of ink for supplying replenishment of ink to the ink containers 304*s* to 304*t*. The capacity of the supply source of ink is not limited to any particular capacity. Preferably, the ink containers 304*s* to 304*t* can be replenished with ink even when building is in progress, that is, during building in the building apparatus 10. In this case, the ink supplier 18 may further include a buffer tank for reducing the effect of replenishment.

The ink container holder 204 may hold the ink containers 304*s* to 304*t* in a replaceable manner. In such a configuration, when the ink used in the building apparatus 10 is changed or during maintenance of the building apparatus 10, the ink containers 304*s* to 304*t* can be replaced appropriately.

The ink containers 304*s* to 304*t* are connected to the inkjet heads 102*s* to 102*t*, respectively, in the head 12 through the ink channels in the building apparatus 10. The inkjet heads 102*s* to 102*t* thus eject ink supplied from the ink containers 304*s* to 304*t*.

In this example, the ink containers 304*s* to 304*t* are ink tanks which are tank-shaped containers that can be replenished with ink. In a modified configuration of the ink supplier 18, ink containers in a different form may be used as the ink containers 304*s* to 304*t*. For example, ink containers such as ink bottles and ink cartridges may be used as the ink containers 304*s* to 304*t*. In this case, containers not capable of being replenished with ink in a state in which they are held in the ink container holder 204 may be used as the ink containers 304*s* to 304*t*.

As explained above, when an object 50 is built by the building apparatus 10, the amount of consumption may greatly vary according to the kinds of ink. For example, when an object 50 with a colored surface is built, the amount of consumption of coloring ink for each color may be significantly small, compared with white ink for forming the interior and ink serving as material of a support layer. The amount of consumption of coloring ink tends to be small, compared with clear ink.

In this respect, in this example, the ink containers 302*y* to 302*k* and the ink containers 304*s* to 304*t* are used as ink containers for storing ink. As is clear from the configuration in the figures, the capacity of each of the ink containers 302*y* to 302*k* is smaller than the capacity of each of the ink containers 304*s* to 304*t*. The capacity of each of the ink containers 302*y* to 302*k* is hereinafter referred to as the capacity of the ink container 302. The capacity of each of the ink containers 304*s* to 304*t* is hereinafter referred to as the capacity of the ink container 304. More specifically, the capacity of the ink container 302 is about 500 mL, in a range of approximately 300 mL to 700 mL, preferably approximately 400 mL to 600 mL. The capacity of the ink container 304 is about 2 L, in a range of approximately 1 L to 3 L, preferably approximately 1.5 L to 2.5 L.

In terms of the capacity ratio, the capacity of the ink container 302 may be equal to or smaller than two-thirds of the capacity of the ink container 304. When a smaller ink container 302 is used, the capacity of the ink container 302 may be equal to or smaller than a half or may be equal to or smaller than one-third of the capacity of the ink container 304. Alternatively, it may be equal to or smaller than one-quarter or may be equal to or smaller than one-tenth.

With such a configuration, even when the amount of consumption varies among inks used for building, ink can be stored in a container according to the amount of consumption of each individual ink. More specifically, ink less consumed can be stored appropriately in the ink container 302 with a small capacity.

In this regard, the difference in amount of consumption among inks does not seem to require changing the capacity of ink containers. However, during building in practice, the difference in amount of consumption among inks may cause various problems.

More specifically, when ink is ejected by inkjet, ink may not be ejected appropriately if the ink quality is deteriorated. It is therefore necessary to appropriately manage the expiration date of ink. In this case, if there is a difference in amount of consumption of ink, ink less consumed tends to expire before it runs out. When an ink container not capable of being replenished is used, the ink container including ink has to be discarded after the expiration date, resulting in much waste.

Meanwhile, when an ink container such as an ink tank capable of being replenished is used as an ink container, old ink tends to be left if the ink is less consumed. In particular, when large ink tanks are used to accommodate ink much consumed, the level of ink less consumed in the ink tank is scarcely reduced although the level of ink much consumed in the ink tank is low. Then, the ink less consumed is expired before the level in the ink tank is running low. In this case, if ink is charged before ink is sufficiently reduced, ink is charged with much old ink being left, and the ratio of the expired ink contained becomes high. As a result, the quality of ink is gradually deteriorated, which may lead to deterioration of quality of building.

In this respect, in this example, the ink container 302 and the ink container 304 each having a capacity according to the amount of consumption of ink are used to appropriately prevent various problems otherwise caused by the difference in amount of consumption among inks. More specifically, the ink container 304 with a large capacity is used for white ink, ink serving as material of a support layer, and clear ink, which are inks much consumed, whereas the ink container 302 with a small capacity is used for coloring ink less consumed. Thus, the ratio of ink left in the container that is the remaining ink, namely, the ratio of the ink level to the capacity of the container becomes uniform, compared with when the capacities of all the ink containers are equal.

In this case, it can be said that the ink level in the ink container 302 with a small capacity becomes low at the timing when the ink level in the ink container 304 with a large capacity becomes low. In this case, the ink container 302 is replaced at the timing when the ink container 304 is replenished, so that all the ink containers can be filled with almost new ink well before the expiration date while waste of ink is prevented. With this configuration, therefore, each individual ink used in the building apparatus 10 can be appropriately managed with a minimum of ink waste. The ink containers may not necessarily be replaced or replenished with ink at the same timing but may be replaced or replenished individually. This configuration can minimize ink waste more appropriately.

In this example, the size of the building apparatus 10 can be reduced appropriately by reducing the capacity of the ink container 302 for storing the coloring ink. More specifically, when a colored object 50 is built, it is necessary to use a plurality of coloring inks of colors such as Y, M, C, and K as explained above. In this case, using a large ink container for each color requires a larger space for installing ink containers. By contrast, in this example, the installation space for ink containers can be significantly reduced by reducing the capacity of the ink container 302 for storing the coloring ink. Also in this respect, it is preferable to reduce the capacity of the ink container 302 for storing the coloring ink.

When ink is expired, the characteristics of ink changes to influence the accuracy of ink droplet landing positions. When a colored object 50 is built, displacement in landing position of coloring ink for each color may prevent appropriate representation of the desired color. As a result, the quality of building may be deteriorated. By contrast, in the case of building ink, the displacement in ink droplet landing positions may have less influence compared with coloring ink. When a colored object 50 is built, therefore, it is desirable to minimize the change in characteristics of ink, especially for coloring ink. Also in this respect, it is preferable to reduce the capacity of the ink container 302 for storing the coloring ink.

As described above, according to this example, various inks used for building can be stored appropriately according to the amount of consumption of each individual ink. The building apparatus 10 having a configuration more suitable for building an object 50 can be provided appropriately.

Considering that the ink containers have different capacities according to the amount of consumption of ink, the ink containers may have different capacities for individual inks more specifically according to the amount of consumption of each individual ink. For example, the ink containers for storing white ink that is building ink, ink serving as material of a support layer, and clear ink may have capacities different from each other. With such a configuration, an ink container having the optimum capacity can be used as appropriate according the amount of consumption of ink which varies depending on the kinds of ink and the purpose of use.

However, in this case, ink containers with various capacities need to be prepared according to the application and the model of the building apparatus 10, leading to complication of inventory management. This may also lead to frequent replacement of ink containers and reduce the work efficiency. In particular, a building apparatus often builds small quantities of a variety of products. In this case, therefore, management and appropriate choice of ink containers used may be difficult. It is therefore preferable that the capacity of the ink container is not excessively diversified and the capacity is versatile to some extent. In practice, it may be preferable that the capacity of the ink container 302 for storing the coloring ink is reduced, as in this example.

Figure 3A:
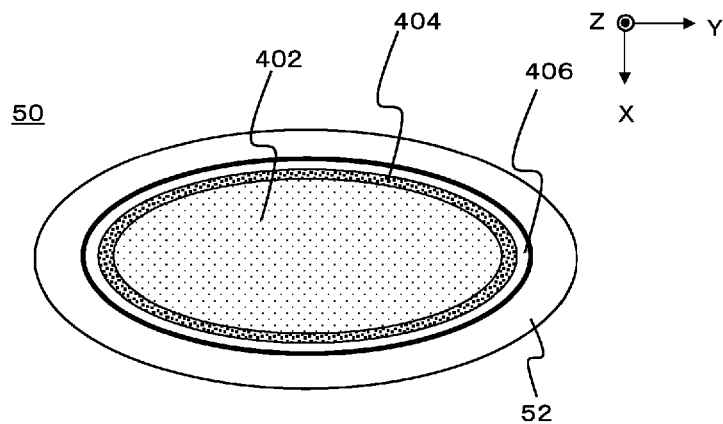
FIGS. 3(a) and 3(b) are diagrams illustrating an exemplary configuration of an object 50 built by the building apparatus 10.
Figure 3B:
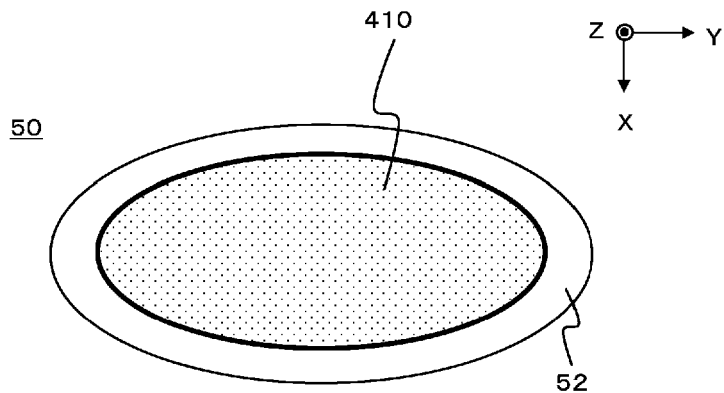

An exemplary configuration of an object built by the building apparatus 10 in this example and a modified configuration of the building apparatus 10 will now be described. FIGS. 3(a) and 3(b) illustrate an exemplary configuration of an object 50 built by the building apparatus 10 in this example. In this example, the building apparatus 10 is capable of building in a plurality of preset building modes. As these building modes, at least a surface decorating mode which is a building mode of building an object 50 with a colored surface and a non-coloring mode of building an object 50 without coloring the surface can be set.

FIG. 3(a) is a cross-sectional view of an example of the configuration of an object 50 built in the surface decorating mode together with a support layer 52. In this case, the building apparatus 10 builds an object 50 having an interior region 402, a colored region 404, and a protective region 406. During building of the object 50, a support layer 52 is formed on the periphery of the object 50 if necessary.

The interior region 402 is a region of the interior of the object 50 to form the shape of the object 50. In this example, the building apparatus 10 forms the interior region 402 using white ink. The interior region 402 thus functions also as a light-reflective region. In this case, the light-reflective region is a light-reflecting region that reflects light entering from the surface side of the object 50 through the protective region 406 and the colored region 404.

The colored region 404 is a region colored by the coloring ink. In this example, the building apparatus 10 forms the colored region 404 on the periphery of the interior region 402, using coloring ink for each color and clear ink. In this case, various colors are represented by adjusting the amount of coloring ink for each color ejected to a corresponding position. Clear ink is used for compensating for variation of the amount of coloring ink that is the amount of ejection per unit volume due to difference in color. With such a configuration, each position of the colored region 404 can be colored appropriately in a desired color.

The protective region 406 is a transparent region for protecting the outer surface of the object 50. In this example, the building apparatus 10 forms the protective region 406 on the periphery of the colored region 404, using clear ink. The object 50 with a colored surface can be formed appropriately by forming each region as described above.

In a modified configuration of the object 50, the specific configuration of the object 50 may be different from the one described above. For example, a separation region for preventing mixing of inks in the regions may be formed using clear ink between the interior region 402 and the colored region 404. The light-reflective region may be formed apart from the interior region 402. In this case, the building ink that is ink dedicated to building other than white ink may be further used to build the object 50, where the interior region 402 is formed using the building ink and the light-reflective region is formed using white ink.

FIG. 3(b) is a cross-sectional view of an exemplary configuration of an object 50 built in the non-coloring mode together with a support layer 52. In this case, the building apparatus 10 builds an object 50 having an object region 410. During building the object 50, a support layer 52 is formed on the periphery of the object 50 if necessary.

The object region 410 is the same or similar region as the interior region 402 formed during building in the surface decorating mode. The building apparatus 10 forms the object region 410 using white ink. The object region 410 may be formed using ink other than white ink, such as clear ink.

The building apparatus 10 may form the object region 410 using different kinds of ink. In this case, the object region 410 may be formed using white ink and clear ink. With such a configuration, the object 50 can be built faster.

When the object 50 as illustrated in FIGS. 3(a) and 3(b) is built, the amount of consumption of the coloring ink is significantly smaller than the amount of consumption of other inks such as white ink, as can be understood from the configuration illustrated in the figures. In this respect, in this example, the capacity of the ink container 302 in FIGS. 2(a) and 2(b) for storing the coloring ink is smaller than the capacity of the ink container 304 in FIGS. 2(a) and 2(b) for storing other kinds of ink, as described above. According to this example, therefore, various inks for use in building can be stored appropriately in the ink containers according to the amount of consumption of ink.

In a modification of the object 50, at least part of the interior region 402 formed in the surface decorating mode and at least part of the object region 410 formed in the non-coloring mode may be formed using coloring ink. In this case, the amount of consumption of coloring ink is larger than when coloring ink is not used for forming these regions. In such a case, the capacity of the ink container 302 for storing coloring ink may be increased according to the amount of consumption of ink.

Figure 4A:
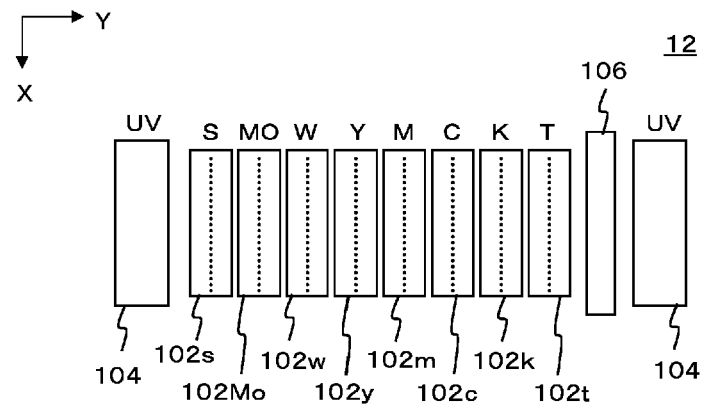
FIGS. 4(a) and 4(b) are diagrams illustrating a modified configuration of each portion in the building apparatus 10.
Figure 4B:
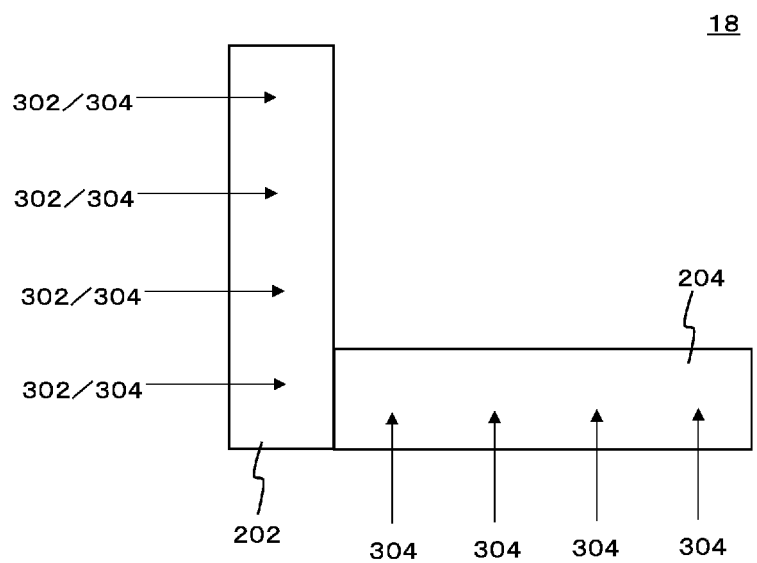

Various modifications of the configuration of the building apparatus 10 will now be described. FIGS. 4(a) and 4(b) illustrate a modified configuration of each portion in the building apparatus 10. FIG. 4(a) illustrates a modified configuration of the head 12. In the configuration of the head 12 described above, white ink is mainly used as building ink. However, as explained above, inks other than white ink may be used as building ink.

More specifically, in the configuration illustrated in FIG. 4(a), the head 12 further includes an inkjet head 102Mo. The inkjet head 102Mo is an inkjet head for ejecting ink dedicated to building that is a model material MO.

In this case, in the ink supplier 18 in FIGS. 2(a) and 2(b), the ink container holder 204 in FIGS. 2(a) and 2(b) further includes the ink container 304 in FIGS. 2(a) and 2(b) for storing ink dedicated to building. The inkjet head 102Mo ejects ink supplied from the ink container 304. Also in such a configuration, the object 50 can be built appropriately.

When building is performed in the surface decorating mode using the head 12 having a configuration illustrated in FIG. 4(a), a light-reflective region is preferably formed apart from the interior region 402 in FIGS. 3(a) and 3(b). In this case, the interior region 402 may be formed using the ink dedicated to building and the light-reflective region may be formed on the periphery thereof using white ink.

In FIG. 4(a), one of a plurality of inkjet heads 102s in the head 12 illustrated in FIG. 1(b) is changed to the inkjet head 102Mo. In this case, the ink container holder 204 in the ink supplier 18 in FIGS. 2(a) and 2(b) holds an ink container 304 for ink dedicated to building, in place of one of two ink containers 304s in the configuration illustrated in FIGS. 2(a) and 2(b). In another modification, an inkjet head 102Mo may be added to the head 12 illustrated in FIG. 1(b). In this case, the ink container holder 204 in the ink supplier 18 further holds an ink container 304 for ink dedicated to building, in addition to the ink containers 304 illustrated in FIGS. 2(a) and 2(b).

In the building apparatus 10, the configuration of the ink supplier 18 can be modified in various ways. FIG. 4(b) illustrates a modification of the configuration of the ink supplier 18 in a simplified manner.

In the configuration mainly described above with reference to FIGS. 2(a) and 2(b) and the like, the ink container holder 202 holds the ink container 302, and the ink container holder 204 holds the ink container 304. In this case, the capacity of the ink container held in each of the ink container holder 202 and the ink container holder 204 is fixed to a predetermined capacity and may be unchangeable. More specifically, in this case, the ink container holder 202 can be considered as a configuration capable of holding the ink container 302 with a small capacity and not capable of holding the ink container 304 with a large capacity. The ink container holder 204 can be considered as a configuration capable of holding the ink container 304 and not capable of holding the ink container 302.

However, the ink container holder 202 and the ink container holder 204 each may hold ink containers with different capacities, rather than ink containers with a single capacity. More specifically, in the configuration illustrated in FIG. 4(b), the ink container holder 202 has a configuration capable of holding both of the ink container 302 and the ink container 304. In this case, the ink containers installed in the ink container holder 202 may be changed according to how the building apparatus 10 is used and the selected building mode.

More specifically, when an object is built under a condition that the object is built using different kinds of ink and that any of different kinds of ink is less consumed, for example, when building is performed in the surface decorating mode, the ink container holder 202 may hold the ink container 302 with a small capacity. In this case, the ink container 302 stores ink less consumed. In this case, during building in any other building mode, the ink container holder 202 may hold the ink container 304 with a large capacity.

With such a configuration, the capacity of the ink container can be set more appropriately according to various requests by users. In this case, the capacity of the ink container used may be determined in accordance with the predicted amount of consumption of ink and/or the building mode. Alternatively, the capacity of the ink container may be determined in accordance with the type of the object to be built. With such a configuration, an ink container having a capacity according to the amount of consumption of ink can be used appropriately.

In another modification of the configuration of the ink supplier 18, the ink container holder 204 may also hold ink containers with different capacities. In this case, the ink container holder 204 may be configured to be capable of holding both the ink container 302 and the ink container 304.

INDUSTRIAL APPLICABILITY

The present invention can be suitably used for the building apparatus 10.

The invention claimed is:

1. A building apparatus configured to build an object in three-dimensional by ejecting ink, comprising:
   a first container holder, configured to hold a first ink container for storing a first ink;
   a second container holder, configured to hold a second ink container for storing a second ink different from the first ink;
   a first ejection head, configured to eject the first ink supplied from the first ink container; and
   a second ejection head, configured to eject the second ink supplied from the second ink container, wherein
   the first ink container has a capacity smaller than a capacity of the second ink container, and the first container holder has a configuration capable of holding the first ink container and not capable of holding the second ink container.

2. The building apparatus according to claim 1, wherein the capacity of the first ink container is equal to or less than two-thirds of the capacity of the second ink container.

3. The building apparatus according to claim 1, wherein
   the second ink container is a container capable of being replenished with ink in a state in which the second ink container is held in the second container holder, and
   the first ink container is a container not capable of being replenished with ink in a state in which the first ink container is held in the first container holder.

4. The building apparatus according to claim 1, wherein
   the building apparatus is capable of building the object colored using a plurality of coloring inks of chromatic colors different from each other,
   when the object colored is built, the first container holder holds a plurality of the first ink containers at least corresponding to colors of the plurality of coloring inks, and
   the plurality of the first ink containers store the plurality of coloring inks.

5. The building apparatus according to claim 4, wherein
   the plurality of coloring inks are inks of process colors for color representation, and
   the second ink container stores an ink other than the inks of process colors.

6. The building apparatus according to claim 1, wherein the second ink container stores a building ink to be used for forming at least an interior of the object.

7. The building apparatus according to claim 1, wherein the second ink container stores a white ink.

8. The building apparatus according to claim 1, wherein the second ink container stores an ink serving as a material of a support layer supporting the object being built.

9. The building apparatus according to claim 1, wherein the second ink container stores a clear ink that is a transparent ink.

10. The building apparatus according to claim 1, wherein
    the second container holder holds a plurality of the second ink containers,
    the second ink containers comprise at least:
      a building ink container for storing a building ink to be used for forming at least an interior of the object; and
      a support ink container for storing an ink serving as a material of a support layer supporting the object being built.

11. The building apparatus according to claim 1, wherein the first ink and the second ink are ultraviolet rays-curable ink curable by radiation of ultraviolet rays.

12. A building method for building an object in three-dimensional by ejecting ink, comprising:
    holding a first ink container for storing a first ink and a second ink container for storing a second ink different from the first ink;
    allowing a first ejection head to eject the first ink supplied from the first ink container; and
    allowing a second ejection head to eject the second ink supplied from the second ink container to build the object, wherein
    the first ink container has a capacity smaller than a capacity of the second ink container, and a first container holder is provided to have a configuration capable of holding the first ink container and not capable of holding the second ink container.

* * * * *